(12) United States Patent
Shibata et al.

(10) Patent No.: US 8,581,556 B2
(45) Date of Patent: Nov. 12, 2013

(54) PROTECTION CIRCUIT AND BATTERY PACK HAVING CURRENT VARYING CIRCUIT TO VARY CURRENT FLOWING THROUGH POWER TERMINAL

(75) Inventors: Kouhei Shibata, Tokyo (JP); Junji Takeshita, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 318 days.

(21) Appl. No.: 13/128,572

(22) PCT Filed: Oct. 30, 2009

(86) PCT No.: PCT/JP2009/068677
§ 371 (c)(1),
(2), (4) Date: May 10, 2011

(87) PCT Pub. No.: WO2010/055785
PCT Pub. Date: May 20, 2010

(65) Prior Publication Data
US 2011/0215765 A1   Sep. 8, 2011

(30) Foreign Application Priority Data
Nov. 14, 2008   (JP) .................. 2008-292226

(51) Int. Cl.
*H01M 10/46*   (2006.01)
(52) U.S. Cl.
USPC ........................................ 320/134
(58) Field of Classification Search
USPC .......................... 320/107, 134, 136
See application file for complete search history.

(56) References Cited

U.S. PATENT DOCUMENTS

| | | |
|---|---|---|
| 7,598,708 B2 | 10/2009 | Kimura et al. |
| 2001/0026147 A1 | 10/2001 | Nakashimo |
| 2004/0104708 A1 | 6/2004 | Zhang |
| 2005/0068008 A1 | 3/2005 | Zhang |
| 2005/0242780 A1 | 11/2005 | Sakuma et al. |
| 2007/0096695 A1 | 5/2007 | Kimura et al. |
| 2007/0114965 A1* | 5/2007 | Kutsuna et al. ............ 318/807 |
| 2007/0141918 A1 | 6/2007 | Ohta |

FOREIGN PATENT DOCUMENTS

| | | |
|---|---|---|
| CN | 1691398 A | 11/2005 |
| CN | 1960104 A | 5/2007 |
| CN | 201113411 Y | 9/2008 |
| JP | 2001-283932 | 10/2001 |
| JP | 2002-186173 | 6/2002 |
| JP | 2004-119267 | 4/2004 |
| JP | 2005-094907 | 4/2005 |
| JP | 2007-195303 | 8/2007 |

OTHER PUBLICATIONS

International Search Report mailed on Jan. 19, 2010.
Chinese Office action mailed Dec. 5, 2012.

* cited by examiner

*Primary Examiner* — Edward Tso
(74) *Attorney, Agent, or Firm* — IPUSA, PLLC

(57) ABSTRACT

A protection circuit includes a detector to detect an overcharging or an excessive discharging of a battery, from a voltage of a power terminal coupled to the battery, a controller to generate a control signal to stop the charging or the discharging of the battery when a detection of the overcharging or the excessive discharging is continuously detected by the detector for a predetermined time, and a current varying circuit to vary a current flowing through the power terminal only for a certain time when the detector detects the overcharging or the excessive discharging of the battery.

10 Claims, 6 Drawing Sheets

PROTECTION CIRCUIT AND BATTERY PACK HAVING CURRENT VARYING CIRCUIT TO VARY CURRENT FLOWING THROUGH POWER TERMINAL

TECHNICAL FIELD

The present invention relates to a protection circuit to protect a battery by stopping charging or discharging of the battery when overcharging or excessive discharging of the battery is detected, and to a battery pack including such a protection circuit.

BACKGROUND ART

Recently, lithium-ion batteries are used as rechargeable batteries in portable equipments, such as digital cameras. Because the lithium-ion battery is sensitive to overcharging and excessive discharging, the lithium-ion battery is used in the form of a battery pack including a protection circuit against overcharging and excessive discharging.

The battery pack may include a protection IC (Integrated Circuit). The protection IC may include an overcharge detection circuit, an excessive discharge detection circuit, an overcurrent detection circuit, and the like. The excessive discharge detection circuit turns OFF a switch within the battery pack when an excessive discharge is detected, in order to stop the discharge of the lithium-ion battery. The overcurrent detection circuit turns OFF a switch within the battery pack when an overcurrent is detected, in order to stop the discharge of the lithium-ion battery. The overcharge detection circuit turns OFF a switch within the battery pack when an overcharge is detected, in order to stop the charging of the lithium-ion battery.

In the overcharge detection circuit, the excessive discharge detection circuit, and the overcurrent detection circuit described above, the overcharge detection, the excessive discharge detection, and the overcurrent detection are determined and the corresponding switch is turned OFF when a corresponding detection time that is measured exceeds a predetermined time (delay time), in order to prevent an erroneous operation. In other words, it takes the predetermined time (delay time) for each of the overcharge detection, the excessive discharge detection, and the overcurrent detection to be determined.

However, when testing the protection IC at the time of fabrication, there is a problem in that the testing time will become long because it takes the predetermined time (delay time) to perform each of the overcharge detection, the excessive discharge detection, and the overcurrent detection. For this reason, when testing the protection IC, a short-test mode may be set to shorten the predetermined time (delay time) or, measures may be taken to eliminate the predetermined time (delay time).

For example, the Patent Document 1 proposes a circuit that judges whether an input level at a test terminal is a high level (VDD), a middle level (VDD/2), or a low level (VSS), and switches a delay time of a comparator output to one of a normal delay time mode, a short-delay time mode, and a no-delay time mode.

PRIOR ART DOCUMENTS

Patent Documents

Patent Document 1: Japanese Laid-Open Patent Publication No. 2002-186173

DISCLOSURE OF THE INVENTION

Problems to be Solved by the Invention

In the proposed circuit described above, the input level at the test terminal is set to one of the high level (VDD), the middle level (VDD/2), and the low level (VSS), in order to set the mode to one of three kinds of modes including the normal delay time mode, the short-delay time mode, and the no-delay time mode. For this reason, the test terminal must be provided in the proposed circuit described above. In addition, in order to judge whether the input level is the high level (VDD), the middle level (VDD/2), or the low level (VSS), two inverters, one NOR circuit, and three NAND circuits are required. As a result, there are problems in that the circuit structure becomes complex, and the cost of the circuit becomes high.

One aspect of the present invention is to provide a protection circuit and a battery pack that do not require the test terminal to be provided.

Means of Solving the Problems

According to one aspect of the present invention, there is provided a protection circuit including a detecting means to detect an overcharging or an excessive discharging of a battery, from a voltage of a power terminal coupled to the battery; a control means to generate a control signal to stop the charging or the discharging of the battery when a detection of the overcharging or the excessive discharging is continuously detected by the detecting means for a predetermined time; and a current varying means to vary a current flowing through the power terminal only for a certain time when the detecting means detects the overcharging or the excessive discharging of the battery.

According to one aspect of the present invention, there is provided a battery pack including a battery; and a protection circuit including a power terminal to which the battery is coupled, the protection circuit including a detecting means to detect an overcharging or an excessive discharging of the battery, from a voltage of the power terminal coupled to the battery; a control means to generate a control signal to stop the charging or the discharging of the battery when a detection of the overcharging or the excessive discharging is continuously detected by the detecting means for a predetermined time; and a current varying means to vary a current flowing through the power terminal only for a certain time when the detecting means detects the overcharging or the excessive discharging of the battery.

Effects of the Invention

According to the present invention, no test terminal is required.

MODE OF CARRYING OUT THE INVENTION

Figure 1:
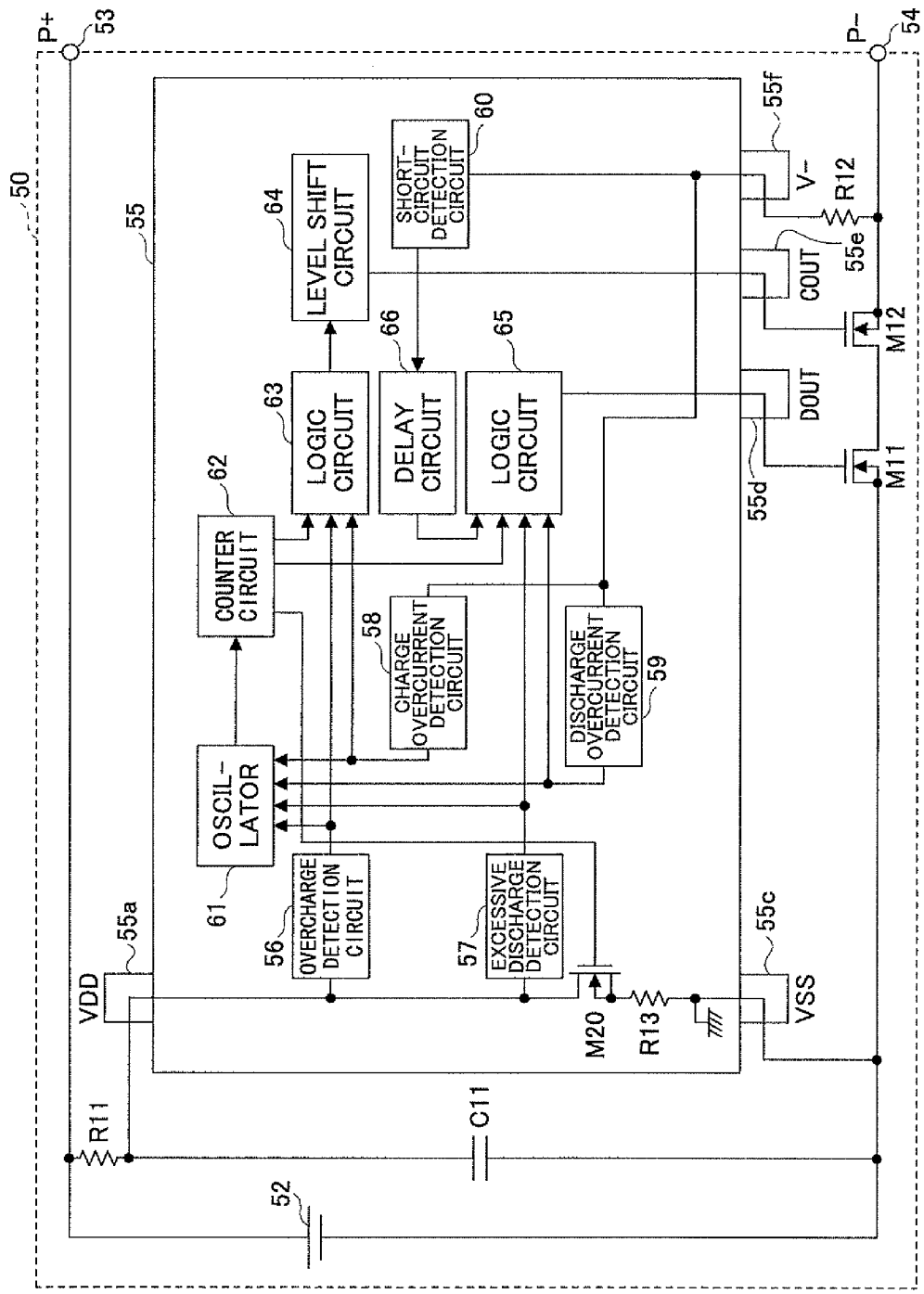
FIG. 1 is a block diagram illustrating a battery pack applied with a protection circuit in one embodiment of the present invention.

A description will be given of each of embodiments of the present invention, by referring to the drawings.

EMBODIMENTS

Protection IC in One Embodiment

FIG. 1 is a block diagram illustrating a battery pack applied with a protection circuit in one embodiment of the present invention. A series circuit, including a resistor R11 and a capacitor C11, is connected in parallel to a lithium-ion battery 52. A positive electrode of the lithium-ion battery 52 is connected to an external terminal (P+) 53 of a battery pack 50 via a wiring, and a negative electrode of the lithium-ion battery 52 is connected to an external terminal (P−) 54 of the battery pack 50 via a wiring and n-channel MOS (Metal Oxide Semiconductor) transistors M11 and M12 that form a switch circuit for interrupting current.

Drains of the MOS transistors M11 and M12 are connected in common, a source of the MOS transistor M11 is connected to the negative electrode of the lithium-ion battery 52, and a source of the MOS transistor M12 is connected to the external terminal 54.

A protection IC 55 protects the lithium-ion battery 52 by stopping the charging or discharging of the lithium-ion battery 52 when the overcharging or excessive discharging of the lithium-ion battery 52 is detected. The protection IC 55 operates by being supplied to a power terminal 55a thereof a power supply voltage VDD from the positive electrode of the lithium-ion battery 52 via the resistor R11, and being supplied to a ground terminal 55c thereof a power supply voltage (or ground voltage) VSS from the negative electrode of the lithium-ion battery 52.

In addition, the protection IC 55 has a terminal 55f connected to one end of a resistor R12, and the other end of this resistor R12 is connected to the external terminal 54. The protection circuit IC 55 has a DOUT output terminal 55d thereof connected to a gate of the MOS transistor M11, and a COUT output terminal 55e thereof connected to a gate of the MOS transistor M12.

The protection IC 44 includes an overcharge detection circuit 56, an excessive discharge detection circuit 57, a charge overcurrent detection circuit 58, a discharge overcurrent detection circuit 59, and a short-circuit detection circuit 60. The overcharge detection circuit 56 detects an overcharging of the lithium-ion battery 52 from a voltage across the terminals 55a and 55c, and supplies a detection signal to an oscillator 61 and a logic circuit 63. The excessive discharge detection circuit 57 detects an excessive discharging of the lithium-ion battery 52 from the voltage across the terminals 55a and 55c, and supplies a detection signal to the oscillator 61 and a logic circuit 65. The overcharge detection circuit 56 and the excessive discharge detection circuit 57 may form a detector or a detecting means to detect the overcharging or excessive discharging of the lithium-ion battery 52 from the voltage of the power terminal 55a.

The charge overcurrent detection circuit 58 detects an overcurrent in which a current flowing through the MOS transistors M11 and M12 becomes excessively large, from the voltage of the terminal 55f, and supplies a detection signal to the oscillator 61 and the logic circuit 63. The discharge overcurrent detection circuit 59 detects an overcurrent in which a current flowing through the MOS transistors M11 and M12 becomes excessively large, from the voltage of the terminal 55f, and supplies a detection signal to the oscillator 61 and the logic circuit 65. The short-circuit detection circuit 60 detects a short-circuit between the external terminals 53 and 54, and supplies a detection signal to the logic circuit 65 via a delay circuit 66.

The terminal 55a is connected to the overcharge detection circuit 56 and the excessive discharge detection circuit 57, and is also connected to a drain of an n-channel MOS transistor M20. A source of the MOS transistor M20 is connected to the terminal 55c via a resistor R13, and a gate of the MOS transistor M20 is connected to a control output terminal of a counter circuit 62.

<Counter Circuit>

Figure 2:
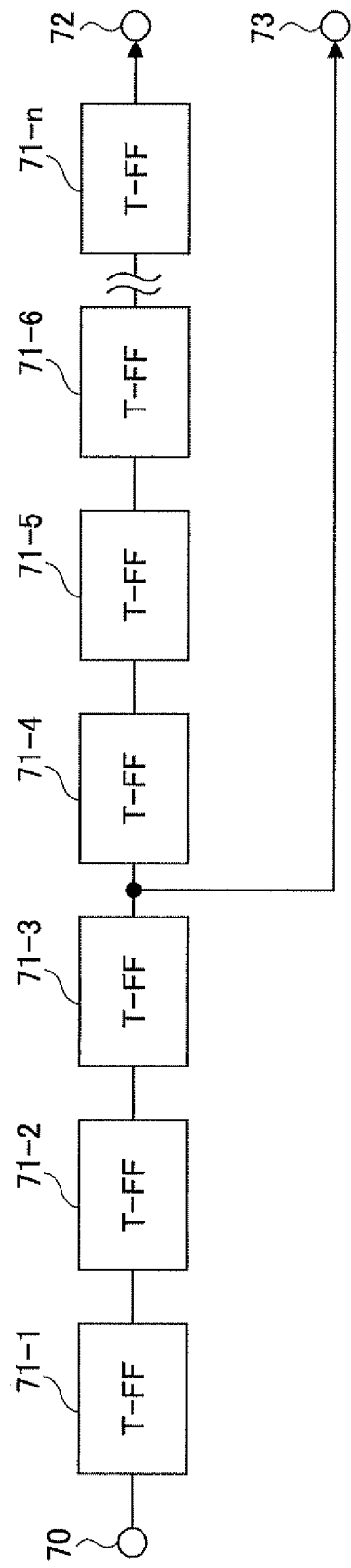
FIG. 2 is a diagram illustrating a circuit structure of an example of a counter circuit.

FIG. 2 is a diagram illustrating a circuit structure of an example of the counter circuit 62. In FIG. 2, a clock signal output from the oscillator 61 is supplied to a terminal 70. The counter circuit 62 is formed by trigger type flip-flops (T-FFs) 71-1 through 71-n having a cascade connection. The clock signal from the terminal 70 is supplied to an input terminal of the trigger type flip-flop 71-1, and for example, an output signal of the trigger type flip-flop 71-n is supplied from an output terminal 72 to the logic circuits 63 and 65. In addition, an output signal of the trigger type flip-flop 71-4, for example, is supplied from a terminal 73 to the gate of the MOS transistor M20. Of course, an output signal from a flip-flop other than the flip-flop 71-4, such as the flip-flop 71-5 or 71-6, may be supplied from the terminal 73.

The counter circuit 62 is normally cleared and a low-level signal is output from the terminals 72 and 73. In addition, when the clock signal from the oscillator 61 is supplied, the counter circuit 62 outputs from the terminal 73 a signal having a high level for a certain time ($2^3 \times \tau = T1$ if 1 period of the clock signal is denoted by $\tau$), and outputs from the terminal 72 a signal having a high level for a predetermined time ($2^{n-1} \times \tau = T2$).

When the overcharge detection circuit 56 or the charge overcurrent detection circuit 58 outputs the detection signal at the time of charging (when the MOS transistors M11 and M12 are in ON states), the oscillator 61 oscillates to output the clock signal, and the counter circuit 62 supplies a low-level output to the logic circuit 63 after counting the clock signal for the predetermined time (T2). The logic circuit 63 sets a control signal to be supplied to the gate of the MOS transistor M12 to the low level in order to stop the charging, when the low-level output from the counter circuit 62 is supplied thereto after the detection signal is supplied thereto, in order to perform a level shift in a level shift circuit 64 to lower the control signal by a predetermined value before supplying this control signal to the gate of the MOS transistor M12 from the terminal 55e. Hence, the charging of the lithium-ion battery 52 is stopped. The level shift is performed because the potential of the external terminal 54 is low with respect to the terminal 55c.

In addition, when the excessive discharge detection circuit 57 or the discharge overcurrent detection circuit 59 outputs the detection signal at the time of discharging (when the MOS transistors M11 and M12 are in ON states), the oscillator 61 oscillates to output the clock signal, and the counter circuit 62 supplies a low-level output to the logic circuit 65 after counting the clock signal for the predetermined time (T2). The logic circuit 65 sets a control signal to be supplied to the gate of the MOS transistor M11 to the low level in order to stop the discharging, when the low-level output from the counter circuit 62 is supplied thereto after the detection signal is supplied thereto, and supplies this control signal to the gate of the MOS transistor M11 from the terminal 55d.

The detection signal from the short-circuit detection circuit 60 is delayed by the delay circuit 66, in a manner similar to the above delay provided by the counter circuit 62, before being supplied to the logic circuit 65. The logic circuit 65 sets a control signal to be supplied to the gate of the MOS transistor M11 to the low level in order to stop the discharging, and supplies this control signal to the gate of the MOS transistor M11 from the terminal 55d. Hence, the discharging of the lithium-ion battery 52 is stopped.

The oscillator 61, the counter circuit 62, the logic circuit 63, the level shift circuit 64, and the logic circuit 65 form a controller or a control means to generate the control signal for stopping the charging or discharging of the lithium-ion battery 52 when the overcharging or excessive discharging of the lithium-ion battery 52 is continuously detected by the detector or the detecting means for a certain time. In addition, the oscillator 61, the counter circuit 62, the MOS transistor M20, and the resistor R13 form a current varying circuit or a current varying means to vary the current flowing through the power terminal 55a only for a certain time when the detector or the detecting means detects the overcharging or excessive discharging of the lithium-ion battery 52. As will be described later, the current varying circuit or the current varying means may increase the current flowing through the power terminal 55a.

<Testing Overcharge Detection Circuit>

Figure 3:
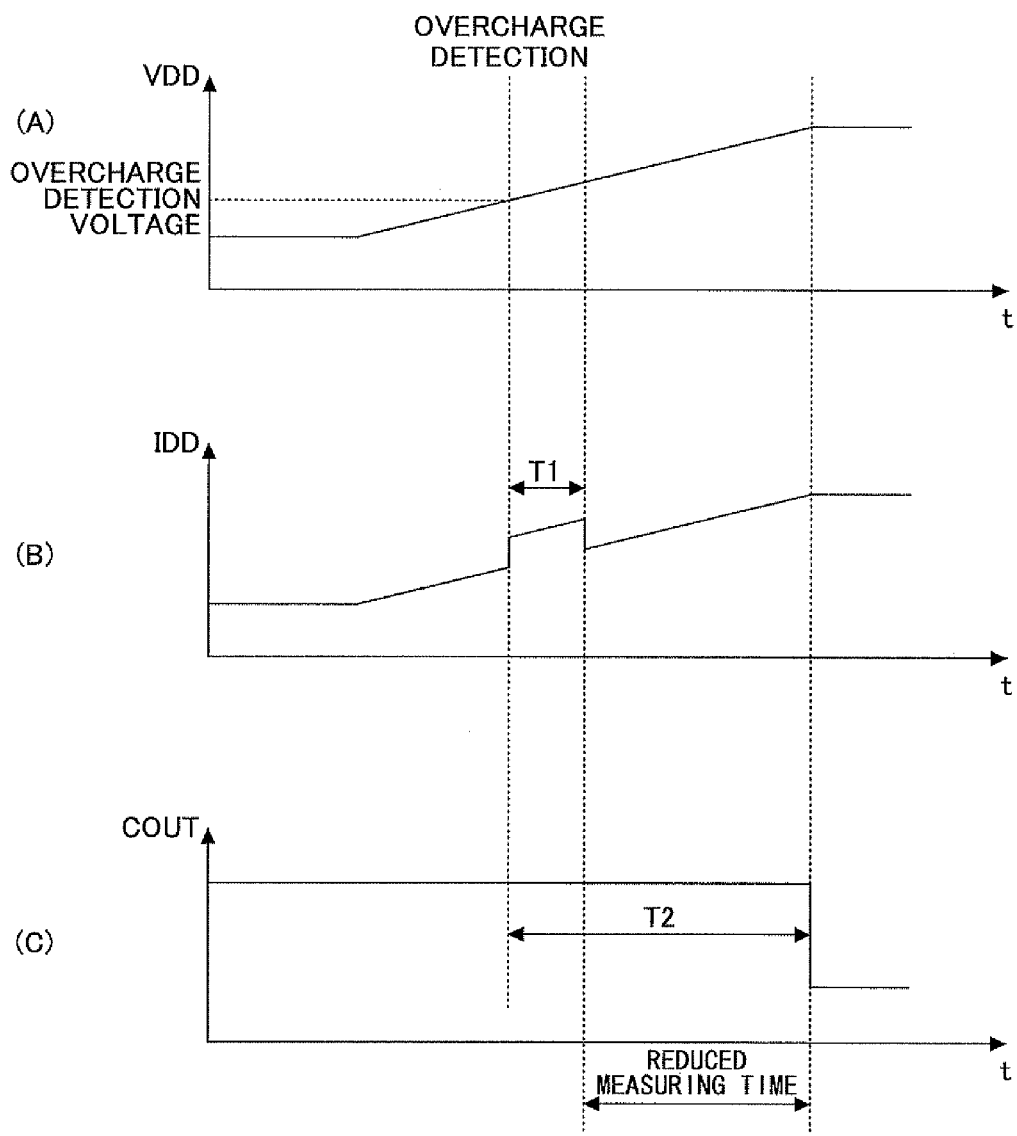
FIG. 3 is a diagram illustrating signal waveforms of signals at various parts in FIG. 1.

FIG. 3 is a diagram illustrating signal waveforms of signals at various parts in FIG. 1. In FIG. 3(A) and FIG. 3(C), the ordinate indicates the voltage in arbitrary units, and in FIG. 3(B), the ordinate indicates the current in arbitrary units. In FIG. 3(A) through FIG. 3(C), the abscissa indicates a time t in arbitrary units. At the time of fabricating the protection IC 55, a testing apparatus (not illustrated) is connected to the terminal 55a, and the power supply voltage VDD applied to the terminal 55a is gradually increased as illustrated in FIG. 3(A) while measuring the current flowing through the terminal 55a. When the overcharge detection circuit 56 detects the overcharging, a high-level signal is supplied to the gate of the MOS transistor M20 for the certain time (T1) from the time of this detection, and the MOS transistor M20 is turned ON. For this reason, a current IDD flowing through the terminal 55a increases only for the certain time (T1) as illustrated in FIG. 3(B), and the MOS transistor M20 thereafter turns OFF, and the current IDD thus assumes a value dependent upon the voltage applied to the terminal 55a. In addition, when the predetermined time (T2) elapses from the detection of the overcharging, a control signal COUT supplied from the terminal 55e to the gate of the MOS transistor M12 assumes a low level as illustrated in FIG. 3(C).

In the case of the proposed circuit of the Patent Document 1 described above, the testing apparatus is connected to the terminals 55a and 55e, the voltage applied to the terminal 55a is gradually increased as illustrated in FIG. 3(A), and a detection voltage of the overcharge detection circuit 56 is measured by measuring the level of the terminal 55e by the testing apparatus. For this reason, a delay time of the time T2 described above is generated, and the proposed circuit sets a mode to reduce this delay time by providing a test terminal.

On the other hand, it is unnecessary to provide a test terminal in this embodiment. The detection voltage of the overcharge detection circuit 56 may be measured by a simple structure which basically includes the MOS transistor M20 that is additionally provided. In other words, the voltage applied to the terminal 55a at a point in time when the current IDD rapidly increases becomes the detection voltage of the overcharge detection circuit 56.

<Testing Excessive Discharge Detection Circuit>

Figure 4:
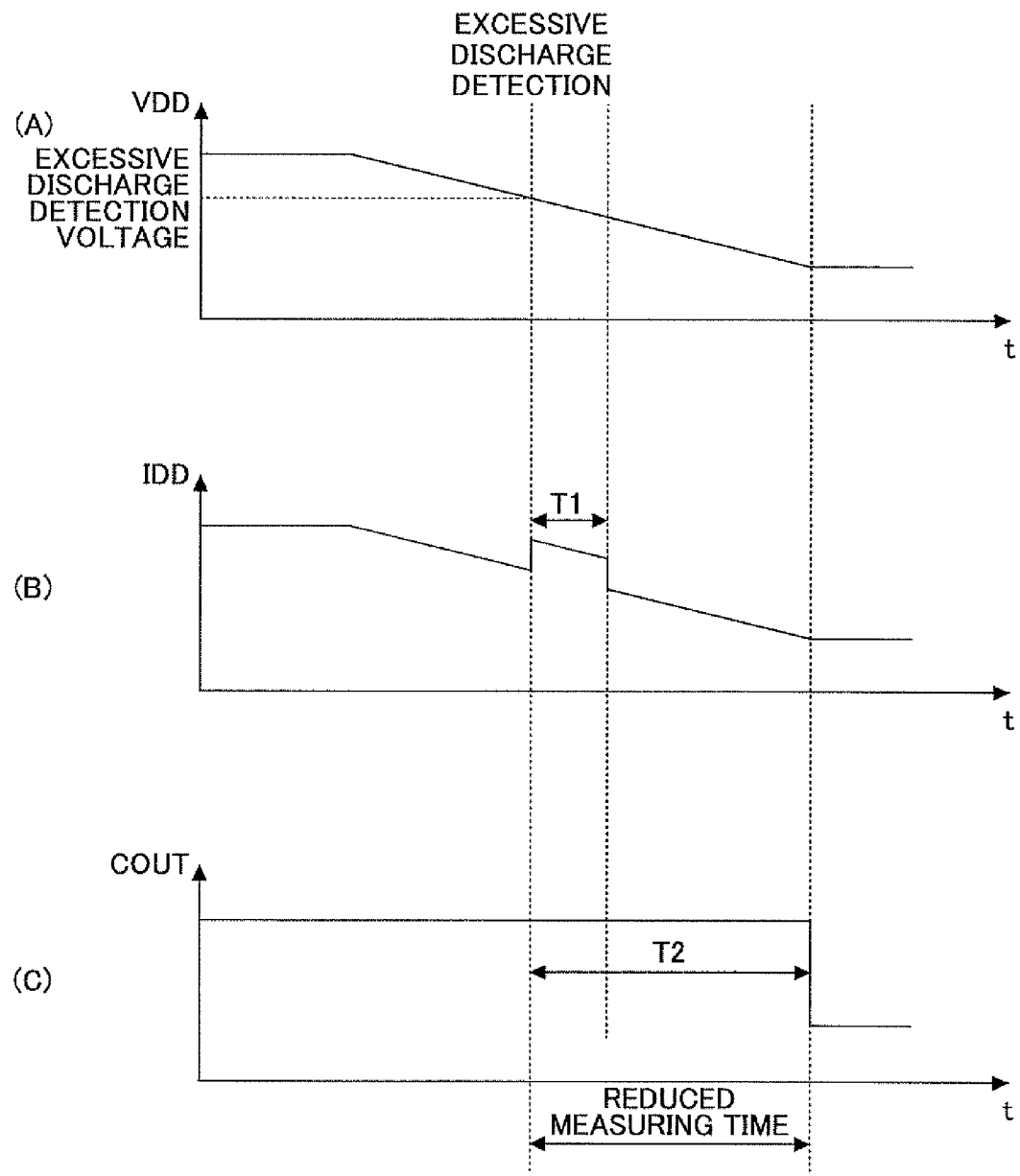
FIG. 4 is a diagram illustrating signal waveforms of signals at various parts in FIG. 1.

FIG. 4 is a diagram illustrating signal waveforms of signals at various parts in FIG. 1. In FIG. 4(A) and FIG. 4(C), the ordinate indicates the voltage in arbitrary units, and in FIG. 4(B), the ordinate indicates the current in arbitrary units. In FIG. 4(A) through FIG. 4(C), the abscissa indicates a time t in arbitrary units. At the time of fabricating the protection IC 55, the testing apparatus is connected to the terminal 55a, and the voltage applied to the terminal 55a is gradually increased as illustrated in FIG. 4(A) while measuring the current flowing through the terminal 55a. When the excessive discharge detection circuit 57 detects the excessive discharging, a high-level signal is supplied to the gate of the MOS transistor M20 for the certain time (T1) from the time of this detection, and the MOS transistor M20 is turned ON. For this reason, a current IDD flowing through the terminal 55a increases only for the certain time (T1) as illustrated in FIG. 4(B), and the MOS transistor M20 thereafter turns OFF, and the current IDD thus assumes a value dependent upon the voltage applied to the terminal 55a. In addition, when the predetermined time (T2) elapses from the detection of the excessive discharging, a control signal COUT supplied from the terminal 55d to the gate of the MOS transistor M11 assumes a low level as illustrated in FIG. 4(C).

In the case of the proposed circuit of the Patent Document 1 described above, the testing apparatus is connected to the terminals 55a and 55e, the voltage applied to the terminal 55a is gradually increased as illustrated in FIG. 4(A), and a detection voltage of the excessive discharge detection circuit 57 is measured by measuring the level of the terminal 55e by the testing apparatus. For this reason, a delay time of the time T2 described above is generated, and the proposed circuit sets the mode to reduce this delay time by providing the test terminal.

On the other hand, it is unnecessary to provide the test terminal in this embodiment. The detection voltage of the excessive discharge detection circuit 57 may be measured by a simple structure which basically includes the MOS transistor M20 that is additionally provided. In other words, the voltage applied to the terminal 55a at a point in time when the current IDD rapidly increases becomes the detection voltage of the excessive discharge detection circuit 57.

A MOS transistor (not illustrated) having a source connected between the terminal 55f and the charge overcurrent detection circuit 58, a drain connected between the terminal 55f and the discharge overcurrent detection circuit 59, and a gate supplied with the output from the terminal 73 of the counter circuit 62 may be additionally provided. In this case, a detection current of the charge overcurrent detection circuit 58 or the discharge overcurrent detection circuit 59 may be measured without delay, by connecting the test apparatus to the terminal 55f, gradually increasing or decreasing the voltage applied to the terminal 55f, and measuring the current flowing through the terminal 55f, in a manner similar to the embodiment described above.

After the respective detection voltages of the overcharge detection circuit 56, the excessive discharge detection circuit 57, the charge overcurrent detection circuit 58, and the discharge overcurrent detection circuit 59 are measured, a trimming resistor (not illustrated) provided in each of the overcharge detection circuit 56, the excessive discharge detection circuit 57, the charge overcurrent detection circuit 58, and the discharge overcurrent detection circuit 59 may be trimmed by a laser trimming based on the measured detection voltages, in order to set threshold values of the overcharge detection circuit 56, the excessive discharge detection circuit 57, the charge overcurrent detection circuit 58, and the discharge overcurrent detection circuit 59 to respective target values.

Protection IC in Another Embodiment

Figure 5:
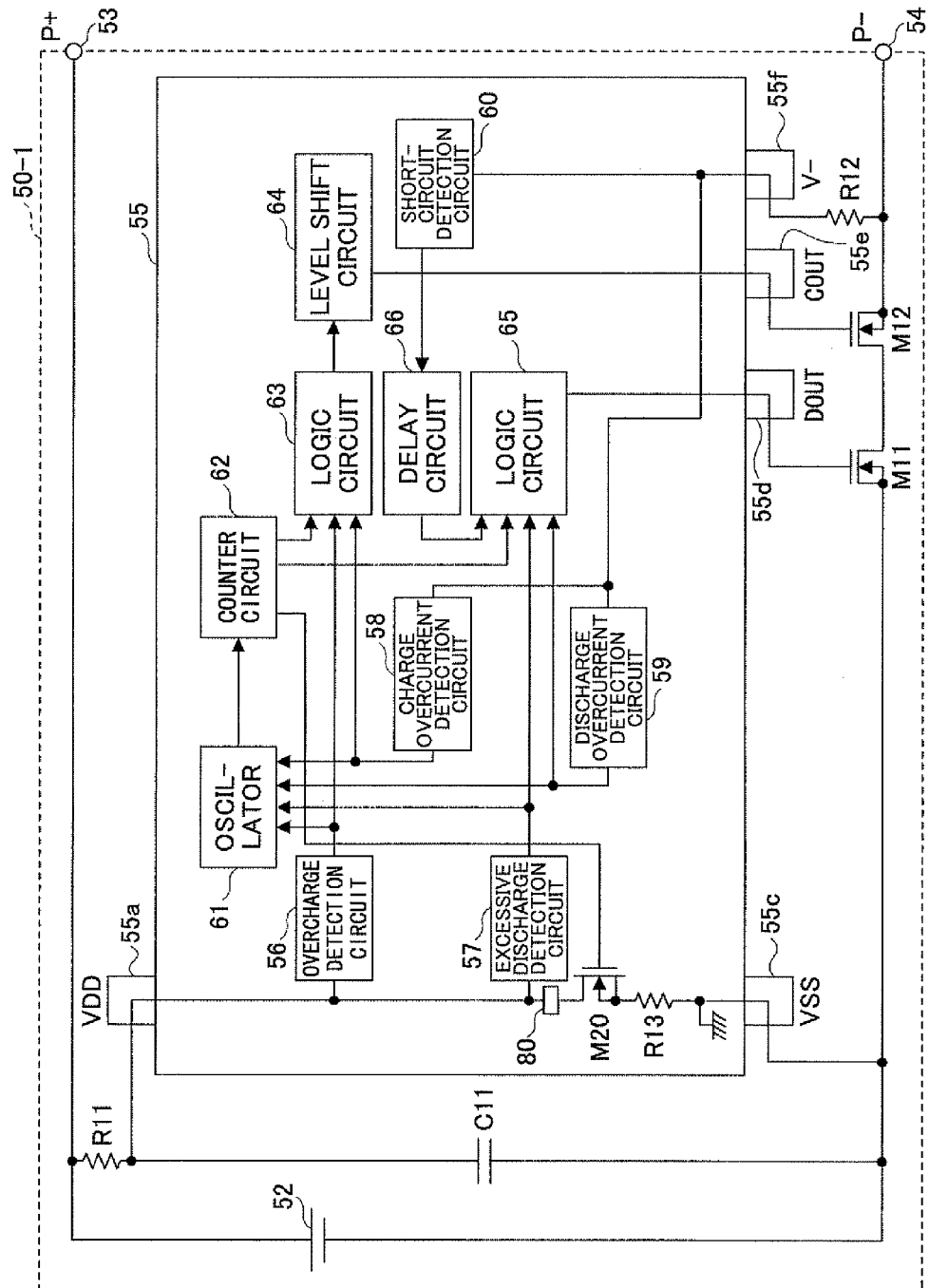
FIG. 5 is a block diagram illustrating a battery pack applied with a protection circuit in another embodiment of the present invention.

FIG. 5 is a block diagram illustrating a battery pack applied with a protection circuit in another embodiment of the present invention. In FIG. 5, those parts that are the same as those corresponding parts in FIG. 1 are designated by the same reference numerals, and a description thereof will be omitted. In this embodiment, a fuse 80 is provided between the terminal 55a and the drain of the MOS transistor M20 within a battery pack 50-1.

<Testing Overcharge Detection Circuit>

The testing of the overcharge detection circuit 56 in this embodiment may be made in a manner similar to the embodiment described above.

After the detection voltage of the overcharge detection circuit 56 is measured, the trimming resistor provided in the overcharge detection circuit 56 may be trimmed by the laser trimming in order to set the threshold value of the overcharge detection circuit 56 to the target value. Thereafter, the fuse 80 is cut by laser. As a result, in the product in which the fuse 80 has been cut, the current IDD flowing through the terminal 55a will not increase only for the certain time (T1) as illustrated in FIG. 3(B), and will assume the value dependent upon the voltage applied to the terminal 55a.

<Testing Excessive Discharge Detection Circuit>

The testing of the excessive discharge detection circuit 57 in this embodiment may be made in a manner similar to the embodiment described above.

<Charge Protection Circuit>

Figure 6:
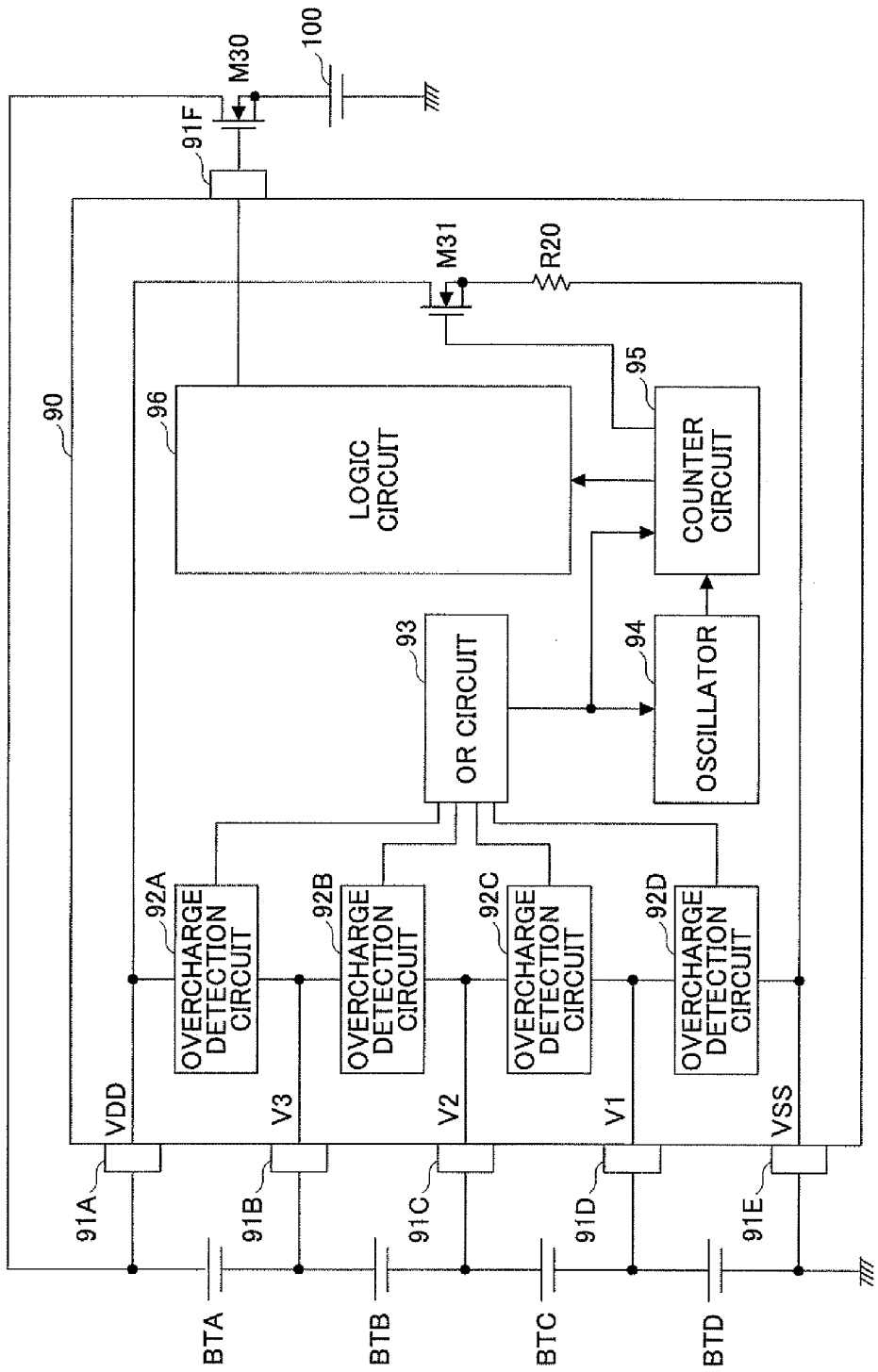
FIG. 6 is a block diagram illustrating an example of a protection circuit of a charging unit.

FIG. 6 is a block diagram illustrating an example of a protection circuit of a charging unit that charges a plurality of batteries that are connected in series, in still another embodiment of the present invention. The protection circuit is provided within a protection IC 90, and controls the charging of secondary batteries BTA, BTB, BTC, and BTD that are connected in series. At the time of charging, the secondary battery BTA is connected between external terminals (or power terminals) 91A and 91B, the secondary battery BTB is connected between external terminals (or power terminals) 91B and 91C, the secondary battery BTC is connected between external terminals (or power terminals) 91C and 91D, and the secondary battery BTD is connected between external terminals (or power terminals) 91D and 91E.

The external terminal 91R is grounded, and the external terminal 91A is connected to a drain of an n-channel MOS transistor M30. A source of the MOS transistor M30 is grounded via a D.C. power supply 100, and a gate of the MOS transistor M30 is connected to an external terminal 91F of the protection IC 90.

In the protection IC 90, an overcharge detection circuit 92A outputs a high-level detection signal when a difference voltage between the external terminals 91A and 91B exceeds a detection voltage thereof. In addition, an overcharge detection circuit 92B outputs a high-level detection signal when a difference voltage between the external terminals 91B and 91C exceeds a detection voltage thereof. Similarly, an overcharge detection circuit 92C outputs a high-level detection signal when a difference voltage between the external terminals 91C and 91D exceeds a detection voltage thereof. In addition, an overcharge detection circuit 92D outputs a high-level detection signal when a difference voltage between the external terminals 91D and 91E exceeds a detection voltage thereof.

The detection signals output from the overcharge detection circuits 92A through 92D are supplied to an OR circuit 93. The OR circuit 93 supplies the detection signal output from one of the overcharge detection circuits 92A through 92D to an oscillator 94 and to a counter circuit 95.

The external terminal 91A is connected to the overcharge detection circuit 92A, and to a drain of an n-channel MOS transistor M31. A source of the MOS transistor M31 is connected to the external terminal 91E via a resistor R20, and a control signal from the counter circuit 95 is supplied to a gate of the MOS transistor M31.

The counter circuit 95 has a structure similar to that illustrated in FIG. 2. The counter circuit 95 is normally cleared, and outputs low-level signals from the terminals 72 and 73. In addition, when a clock signal from the oscillator 94 is supplied to the counter circuit 95, the counter circuit 95 supplies to the gate of the MOS transistor M31 a signal that assumes a high level for a certain time (T3), and supplies to a logic circuit 96 a signal that assumes a high level for a predetermined time (T4>T3).

When one of the overcharge detection circuits 92A through 92D outputs the overcharge detection signal at the time of the charging (when the MOS transistor M30 is in an ON state), the oscillator 94 oscillates to output a clock signal, and the counter circuit 95 outputs a low-level signal to the logic circuit 96 after counting the clock signal for the predetermined time (T4). The logic circuit 95 sets a control signal to be supplied to the gate of the MOS transistor M30 to a low level in order to stop the charging, when the low-level output from the counter circuit 95 is supplied thereto after the detection signal is supplied thereto.

At the time of fabricating the protection IC 90, the testing apparatus is connected between the external terminals 91A and 91B (or between 91B and 91C, or between 91C and 91D, or between 91D and 91E), and the voltage applied between the external terminals 91A and 91B (or between 91B and 91C, or between 91C and 91D, or between 91D and 91E) is gradually increased in a manner similar to that illustrated in FIG. 3(A) while measuring the current flowing through the terminal 91A (or 91B, or 91C, or 91D). When the overcharge detection circuit 92A (or 92B, or 92C, or 92D) detects the overcharging, a high-level signal is supplied to the gate of the MOS transistor M31 for the certain time (T3) from the time of this detection, and the MOS transistor M31 is turned ON. For this reason, a current IDD flowing through the terminal 91A (or 91B, or 91C, or 91D) increases only for the certain time (T3), and the MOS transistor M31 thereafter turns OFF, and the current IDD thus assumes a value dependent upon the voltage applied between the external terminals 91A and 91B (or between 91B and 91C, or between 91C and 91D, or between 91D and 91E). In addition, when the predetermined time (T4) elapses from the detection of the overcharging, a control signal supplied from the external terminal 91F to the gate of the MOS transistor M30 assumes a low level.

The overcharge detection circuits 92A through 92D form a detector or a detecting means to detect the overcharging of the batteries BTA through BTD, from the voltages of the power terminals 91A through 91D. The oscillator 94, the counter circuit 95, the logic circuit 96, and the OR circuit 93 form a controller or a control means to generate the control signal that stops the charging of the batteries BTA through BTD, when the overcharging of the batteries BTA through BTD is continuously detected by the detector or the detecting means for the predetermined time. In addition, the oscillator 94, the counter circuit 95, the MOS transistor M31, and the resistor R20 form a current varying circuit of a current varying means to vary the current flowing through the power terminals 92A through 92D only for the certain time when the detector or the detecting means detects the overcharging of the batteries BTA through BTD.

In the embodiment described above, the current flowing through the terminal 55a is increased at the time of the detection by the overcharge detection circuit 56 or the excessive discharge detection circuit 57. However, the current flowing through the terminal 55a may be decreased instead.

This application is based upon and claims the benefit of priority of a Japanese Patent Application No. 2008-292226 filed on Nov. 14, 2008, in the Japanese Patent Office, the disclosure of which is hereby incorporated by reference.

Further, the present invention is not limited to these embodiments, but various variations and modifications may be made without departing from the scope of the present invention.

DESCRIPTION OF REFERENCE NUMERALS

50 Battery Pack
52 Lithium-Ion Battery
55 Protection IC
56 Overcharge Detection Circuit
57 Excessive Discharge Detection Circuit
58 Charge Overcurrent Detection Circuit
59 Discharge Overcurrent Detection Circuit
60 Short-Circuit Detection Circuit
61 Oscillator
62 Counter Circuit
63, 65 Logic circuit
66 Delay Circuit
171-1 to 171-$n$ Trigger Type Flip-Flop
80 Fuse
M11, M12, M20 MOS Transistor

The invention claimed is:

1. A protection circuit comprising:
a detector configured to detect an overcharging or an excessive discharging of a battery, from a voltage of a power terminal coupled to the battery;
a controller configured to generate a control signal to stop the charging or the discharging of the battery when a detection of the overcharging or the excessive discharging is continuously detected by the detector for a predetermined time; and
a current varying circuit configured to vary a current flowing through the power terminal only for a certain time when the detector detects the overcharging or the excessive discharging of the battery.

2. The protection circuit as claimed in claim 1, wherein the current varying circuit increases the current flowing through the power terminal.

3. The protection circuit as claimed in claim 1, further comprising:
a fuse coupled between the power terminal and the current varying circuit.

4. The protection circuit as claimed in claim 1, wherein the detector includes:
an overcharge detection circuit configured to detect the overcharging of the battery; and
an excessive discharge detection circuit configured to detect the excessive discharging of the battery.

5. The protection circuit as claimed in claim 1, wherein the controller controls an ON or OFF state of a switch circuit depending on the control signal, said switch circuit being coupled between the battery and the protection circuit and being configured to stop the charging or the discharging of the battery.

6. A battery pack comprising:
a battery; and
a protection circuit including a power terminal to which the battery is coupled,
said protection circuit comprising:
a detector configured to detect an overcharging or an excessive discharging of the battery, from a voltage of the power terminal coupled to the battery;
a controller configured to generate a control signal to stop the charging or the discharging of the battery when a detection of the overcharging or the excessive discharging is continuously detected by the detector for a predetermined time; and
a current varying circuit configured to vary a current flowing through the power terminal only for a certain time when the detector detects the overcharging or the excessive discharging of the battery.

7. The battery pack as claimed in claim 6, further comprising:
a switch circuit, coupled between the battery and the protection circuit, and configured to stop the charging or the discharging of the battery depending on the control signal.

8. The battery pack as claimed in claim 6, wherein the current varying circuit increases the current flowing through the power terminal.

9. The battery pack as claimed in claim 6, wherein the protection circuit further comprises:
a fuse coupled between the power terminal and the current varying circuit.

10. The battery pack as claimed in claim 6, wherein the detector includes:
an overcharge detection circuit configured to detect the overcharging of the battery; and
an excessive discharge detection circuit configured to detect the excessive discharging of the battery.

* * * * *